UNITED STATES PATENT OFFICE.

ANTON MESSERSCHMITT, OF STOLBERG GERMANY, ASSIGNOR, BY MESNE ASSIGNMENTS, TO THE CHEMICAL FOUNDATION, INC., A CORPORATION OF DELAWARE.

PROCESS FOR TREATING MINERALS CONTAINING POTASSIUM.

1,344,705.

Specification of Letters Patent.  Patented June 29, 1920.

No Drawing.   Application filed December 11, 1914.  Serial No. 876,723.

*To all whom it may concern:*

Be it known that I, ANTON MESSERSCHMITT, a citizen of Germany, and resident of Stolberg 2, Germany, have invented certain new and useful Improvements in Processes for Treating Minerals Containing Potassium, of which the following is a specification.

My invention relates to the treatment of minerals containing potassium, and more especially to a process for treating such minerals with a view to recovering the useful substances contained therein.

I have ascertained that it is possible to decompose certain minerals containing potassium preferably those of the leucite type, by heating them with sodium salt solutions under pressure at a high temperature. The decomposition progresses at such a rate and to such an extent that the method is commercially useful for the production of potassium containing fertilizers soluble in water and of pure potassium salts.

If, for instance, a slime of finely powdered leucite is boiled in a sodium salt solution under pressure in an autoclave provided with a stirring device, the potassium of the mineral is replaced by sodium and a reaction mixture is obtained which consists of an aqueous solution of the freed potassium salt and a residue insoluble in water which may inclose, besides the sodium absorbed, also part of the potassium. This residue having been decomposed by the treatment described forms excellent fertilizers. The slime obtained can be dried directly with a view to producing a high grade fertilizer, no lixiviation being required and no losses being encountered. On the other hand the parts of the mixture which are soluble in water can be separated from the solid constituents and the solution obtained can then be subjected to a further treatment.

This process lends itself especially to the treatment of minerals containing leucite, and more especially separated leucite, with an increased percentage of potassium. By separated leucite, I mean crystalline leucite which has been obtained by separation from natural rocks containing leucite in a crystalline form, as in the case of leucittephrit. It is further applicable to certain double silicates of potassium and calcium prepared artificially, for instance by burning natural potassium minerals with lime or with lime and phosphates, or by boiling them with lime under pressure, or in any other suitable manner. When double silicates obtained by decomposing potassium minerals with lime and phosphates are used, the final product is a compost containing potassium and phosphoric acid.

If sodium nitrate is used for the decomposition, there result nitrogen composts containing potassium or potassium and phosphoric acid. The use of sodium nitrate further offers the advantage of allowing the minerals to be decomposed without the admixture of any agents detrimental to the soil or the plants, such as sulfur trioxid, chlorin or the like, the decomposition medium costing nothing for the reason that it retains its valuable properties, that is to say, its content of nitrogen, unaltered.

The invention is based upon the surprising observation of the fact that a small excess of sodium salt suffices to completely convert the potassium leucite into sodium-leucite, mixtures of potassium and sodium salts containing highly concentrated potassium salt being obtained.

It was impossible to foresee such a result. On the contrary, it was to be expected that the potassium leucite in contact with a solution containing a high percentage of sodium would be converted only partly into sodium leucite. An incomplete recovery of the leucite-potassium would have rendered the process uncommercial. According to the invention it is possible for instance to restrict the excess of sodium salt to such an extent that by treating leucite with a sodium nitrate solution a high grade potassium-sodium-nitrate containing about 25 per cent. potash and 15 per cent. nitrogen is obtained.

According to my observations the reaction will come to a standstill only at the moment when two parts by weight of potassium nitrate to one part of sodium nitrate are present in the solution. Besides the complete utilization of all the valuable constituents of the leucite the process offers the advantage of avoiding the carrying along of great masses of sodium salt during manufacture and of furnishing solutions having a high percentage of potassium salt.

The favorable state of equilibrium mentioned above renders a direct exchange of the sodium for potassium possible. The potassium salts being present in solution are separated from the insoluble residue and the concentration is such that they may be recovered from the solution in a pure state by fractional crystallization.

In fixing the excess of sodium salt it is preferable to choose such a relation as will cause the potassium salt to be in excess of the sodium salt in the aqueous part of the product of reaction.

In carrying out my invention I have made further observations which are of great importance with regard to a successful technical and commercial performance of my method.

I have discovered that at the surface of the silicate particles the reaction progresses with great speed, however its effect does not reach beyond a certain depth. With particles of a greater diameter therefore, the core will be affected only with difficulty or not at all.

In order to obtain a quantitative conversion the diameter of all particles of the mineral should be sufficiently small in order that the reaction solution may permeate the entire substance. According to experiments made the degree of pulverization usually adopted in reactions of this type and corresponding for instance to the grain of Thomas-meal does not allow a quantitative separation of the potassium of the mineral, while, if mineral meal of abnormally fine, scarcely perceptible grain and as uniform a size of grains as possible is used, an extraordinary acceleration of the reaction and a quantitative output is obtained.

I have further ascertained that contrary to what could be expected, in case that a highly concentrated sodium salt solution is used, the reaction is an easy and complete one. It is therefore possible to use the sodium salt employed for the conversion in as high a concentration as desired. Thus only part of it may be dissolved, while the rest is contained in the slime suspension in solid form. This gives a means for considerably reducing the costs of concentration by evaporation.

In the technical performance of my method I may proceed as follows: Separated leucite is disintegrated to the extent of forming an impalpable uniform powder. This can be attained for instance by pneumatic separation, by decantation or the like. The highly disintegrated product is then intimately mixed with a sodium salt such as for instance Chile saltpeter, the quantity of sodium salt being so proportioned that the excess over the potassium to be separated is only small. The mixture is then moistened with water in order to produce a pasty mass of mineral and salt, this latter being dissolved only partly. This mixture is then subjected, in an autoclave or the like, to the action of superheated steam, and in a short time a quantitative separation of the potassium salts is attained.

The product of reaction can be dried without separating the soluble and the insoluble parts. The ground dry product is a valuable fertilizer. On the other hand the parts soluble in water can be separated from the solid residue and treated by themselves. The lixiviation of the residue is easy because, notwithstanding the radical decomposition suffered during the reaction the silicate does not undergo any outwardly visible change. The finest particles neither swell nor do they cake together; on the contrary the fine mineral powder remains loosely and movably suspended in the aqueous solution, even in the case, where stirring is entirely dispensed with.

By evaporating the solution separated from the insoluble residue a mixed potassium-sodium-salt with a high percentage of potassium, such as for instance potassium-sodium-nitrate is obtained. In order to get pure potassium salts it is preferable to make use of fractional crystallization. The crystallizing tendency of potassium nitrate being a very great one, it is easy to separate this salt in pure form from the solution by fractional crystallization. The remaining mother-liquor is preferably reëntered in the process so as to be used again in the cycle of operations.

The fact mentioned above of the mineral not undergoing any physical changes nor swelling or caking together, combined with the possibility of carrying out the separation of the potassium quickly and without any losses, makes it easy to carry out the process continuously and in an especially advantageous way. This can be effected for instance by continuously passing the suspension of the mineral powder in the sodium solution at an elevated temperature through a battery of elements resisting high pressure, the velocity of the slime passing through the apparatus being so proportioned that the reaction has come to an end before the slime leaves the battery.

In continuous operation it is especially important to use mineral of the very finest grain and the highest possible uniformity of grain-diameter. It is further important to use a highly concentrated salt solution in order to increase its density and thereby to keep the mineral powder suspended in the liquid.

My process can be carried out for instance as follows:

The slime is passed through the battery under pressure either continuously by means of a high pressure slime pump or intermittently by compressed air or by an automatic montejus. Preferably the slime is first heated by direct steam to near the boiling point. After pressure has been put on, the slime passes through a superheater in order to be brought therein to the temperature required for the reaction by means of superheated steam or water or an oil-bath. By applying temperatures of from 170 to 220 degr. C. and a pressure of from 10 to 25 atmospheres it is possible to complete the conversion within a short time. It has been shown by experiment that according to the materials employed and the other conditions prevailing the conversion took 1 to 4 hours, sometimes even less than one hour, to be completed. The slime converted within the battery is cooled down below 100 degr. C. in a refrigerator and is afterward tapped off through a valve either continuously or intermittently.

A very economical way of carrying out the process consists in using the heat of the slime leaving the battery for heating the slime freshly admitted to a high temperature in a counter current apparatus. In this case merely the loss of heat through radiation must be restored, for instance by causing the slime to pass through a superheater and by providing a good insulation for the whole system or by admitting heat to the whole system from outside by means of heated oil or water or from some furnace.

A very simple and inexpensive form of an apparatus for use in this process is a long tube of comparatively small section and of sufficient length to allow the whole slime, while passing through with sufficiently great speed, to be converted before leaving the tube again.

The tube may consist for instance of a greater number of U-shaped tubes welded together; it may assume the form of a spiral or any other suitable form.

I claim:

1. A process for treating silicates containing potassium which comprises heating the finely ground silicate and sodium nitrate in the presence of water at a high temperature under pressure.

2. A process for treating leucite which comprises heating the finely ground leucite with sodium nitrate in the presence of water at a high temperature.

3. A process for treating silicates containing potassium which comprises mixing the finely ground silicate with a soluble sodium salt and water, heating the mixture to a temperature beyond the boiling point under pressure and passing the hot slime thus formed through a counter-current heater containing fresh slime for treatment.

4. A process for treating silicates containing potassium which comprises heating the finely ground silicate and sodium nitrate in the presence of water at a high temperature under pressure until the sodium of the sodium nitrate and the potassium of the silicate compound have replaced each other.

In testimony whereof I have signed my name to this specification in the presence of two subscribing witnesses.

ANTON MESSERSCHMITT.

Witnesses:
JEAN GRUND,
CARL GRUND.